US011164601B2

(12) United States Patent  
Child et al.

(10) Patent No.: US 11,164,601 B2  
(45) Date of Patent: Nov. 2, 2021

(54) ADAPTIVE VIDEO PLAYBACK

(71) Applicant: Vivint, Inc., Provo, UT (US)

(72) Inventors: Michael D. Child, Lehi, UT (US); Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/001,935

(22) Filed: Jan. 20, 2016

(65) Prior Publication Data

US 2017/0206928 A1  Jul. 20, 2017

(51) Int. Cl.
  *G11B 27/00* (2006.01)
  *H04N 9/87* (2006.01)
  *G08B 13/196* (2006.01)
  *H04N 7/18* (2006.01)
  *G11B 27/28* (2006.01)

(52) U.S. Cl.
  CPC .......... *G11B 27/005* (2013.01); *G08B 13/196* (2013.01); *G08B 13/19671* (2013.01); *G11B 27/28* (2013.01); *H04N 7/18* (2013.01); *H04N 9/87* (2013.01)

(58) Field of Classification Search
  CPC ....... H04N 21/21805; H04N 21/23418; H04N 21/4223; H04N 21/44008; H04N 21/44231; H04N 21/6373; H04N 21/6587; H04N 7/181; H04N 7/183; H04N 7/188; H04N 9/87; G11B 27/005; G11B 27/28; G08B 13/196; G08B 13/19671
  USPC ................ 725/9, 74, 88, 105, 135; 348/143, 348/152–156, 159
  See application file for complete search history.

(56) References Cited

U.S. PATENT DOCUMENTS

| | | | |
|---|---|---|---|
| 9,002,173 B2 | 4/2015 | Barton et al. | |
| 2008/0235583 A1* | 9/2008 | Ostergaard | G11B 27/34 386/343 |
| 2010/0026871 A1* | 2/2010 | Yonaha | H04N 7/181 348/333.01 |
| 2010/0118147 A1 | 5/2010 | Dorneich et al. | |
| 2011/0134240 A1* | 6/2011 | Anderson | H04W 4/02 348/143 |
| 2012/0051604 A1* | 3/2012 | Dudovich | G06K 9/00771 382/115 |
| 2012/0062732 A1* | 3/2012 | Marman | H04N 7/18 348/142 |
| 2014/0267716 A1* | 9/2014 | Child | H04N 7/186 348/143 |
| 2014/0267735 A1 | 9/2014 | Carey | |
| 2015/0154452 A1* | 6/2015 | Bentley | G11B 27/031 386/201 |

(Continued)

FOREIGN PATENT DOCUMENTS

WO  2004068855 A1  8/2004

*Primary Examiner* — Jeremy S Duffield
(74) *Attorney, Agent, or Firm* — Holland & Hart, LLP

(57) ABSTRACT

Methods and systems for routing messages are described. In one embodiment, the method includes monitoring a security system of a premises, identifying a video file captured by the security system of the premises, determining one or more aspects of the video file, selecting a first playback speed based on the determined one or more aspects of the video file, and playing the video file at the first playback speed. In some cases, the one or more aspects of the video file includes at least one of runtime, file size, and frame rate.

20 Claims, 7 Drawing Sheets

(56) References Cited

U.S. PATENT DOCUMENTS

| | | | |
|---|---|---|---|
| 2015/0341599 A1* | 11/2015 | Carey | H04N 7/181 |
| | | | 348/150 |
| 2015/0350902 A1* | 12/2015 | Baxley | H04W 4/90 |
| | | | 726/7 |
| 2016/0005281 A1* | 1/2016 | Laska | G08B 13/1961 |
| | | | 348/143 |
| 2016/0188980 A1* | 6/2016 | Martin | G06K 9/00771 |
| | | | 382/103 |
| 2016/0217825 A1* | 7/2016 | Li | H04N 21/4325 |
| 2017/0076571 A1* | 3/2017 | Borel | G08B 13/19673 |
| 2017/0177925 A1* | 6/2017 | Volkart | B64C 39/024 |

* cited by examiner

ADAPTIVE VIDEO PLAYBACK

BACKGROUND

The present disclosure, for example, relates to security and/or automation systems, and more particularly to adaptive video playback.

Security and automation systems are widely deployed to provide various types of communication and functional features such as monitoring, communication, notification, and/or others. These systems may be capable of supporting communication with a user through a communication connection or a system management action.

Currently, a video may be captured by a security camera of a security and automation system located at a premises such as a home, school, or business. Upon being captured, the video file may be made available for playback. The recipient of the video file may manually select the video file for playback and watch the entire video or manually select which portions of the video file to view.

SUMMARY

The present disclosure provides description of systems and methods for adaptive video playback. A video may be captured by a security camera of a security and automation system located at a premises. The systems and methods may identify the video and determine one or more aspects of the video such as runtime, frame rate, etc. Based on the one or more determined aspects of the video, the systems and methods may be configured to autonomously select a playback speed for the captured video.

A method for adaptive video playback is described. In one embodiment, the method may include monitoring a security system of a premises, identifying a video file captured by the security system of the premises, determining one or more aspects of the video file, selecting a first playback speed based on the determined one or more aspects of the video file, and playing the video file at the first playback speed. In some cases, the one or more aspects of the video file may include at least one of runtime, file size, and frame rate. In some embodiments, the one or more aspects of the video file may include at least one of detecting whether an occupant of the premises appears in the video file, detecting whether the occupant is moving or stationary, detecting whether the occupant is known or unknown, detecting whether a sensor is triggered in relation to at least a portion of the video file, and so forth.

In some embodiments, the method may include assigning the first playback speed to the video file when the video file is within a first runtime range. The method may include assigning a second playback speed to the video file when the video file is within a second runtime range. In some cases, the second playback speed may be different than the first playback speed.

In some embodiments, the method may include reducing a current playback speed for at least a portion of the video file that shows an occupant of the premises moving within the premises. Additionally, or alternatively, the method may include increasing a current playback speed for at least a portion of the video file that shows an occupant of the premises remaining stationary for a predetermined period of time. In some embodiments, the method may include skipping at least a portion of the video file that includes no detected motion. In some configurations, the method may include returning to a previous playback speed based on detecting an occupant of the premises becoming stationary after the occupant was detected moving.

In some embodiments, the method may include reducing a current playback speed for at least a portion of the video file that shows an unknown occupant. In some cases, the method may include increasing a current playback speed in relation to a first sensor of the security system being triggered. Additionally, or alternatively, in some embodiments, the method may include decreasing the current playback speed in relation to a second sensor of the security system being triggered.

An apparatus for client side queue sharding is also described. In one embodiment, the apparatus may include a processor, memory in electronic communication with the processor, and instructions stored in the memory, the instructions being executable by the processor to perform the steps of monitoring a security system of a premises, identifying a video file captured by the security system of the premises, determining one or more aspects of the video file, selecting a first playback speed based on the determined one or more aspects of the video file, and playing the video file at the first playback speed. In some cases, the one or more aspects of the video file may include at least one of runtime, file size, and frame rate. In some embodiments, the one or more aspects of the video file may include at least one of detecting whether an occupant of the premises appears in the video file, detecting whether the occupant is moving or stationary, detecting whether the occupant is known or unknown, detecting whether a sensor is triggered in relation to at least a portion of the video file, and so forth.

A non-transitory computer-readable medium is also described. The non-transitory computer readable medium may store computer-executable code, the code being executable by a processor to perform the steps of monitoring a security system of a premises, identifying a video file captured by the security system of the premises, determining one or more aspects of the video file, selecting a first playback speed based on the determined one or more aspects of the video file, and playing the video file at the first playback speed. In some cases, the one or more aspects of the video file may include at least one of runtime, file size, and frame rate. In some embodiments, the one or more aspects of the video file may include at least one of detecting whether an occupant of the premises appears in the video file, detecting whether the occupant is moving or stationary, detecting whether the occupant is known or unknown, detecting whether a sensor is triggered in relation to at least a portion of the video file, and so forth.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
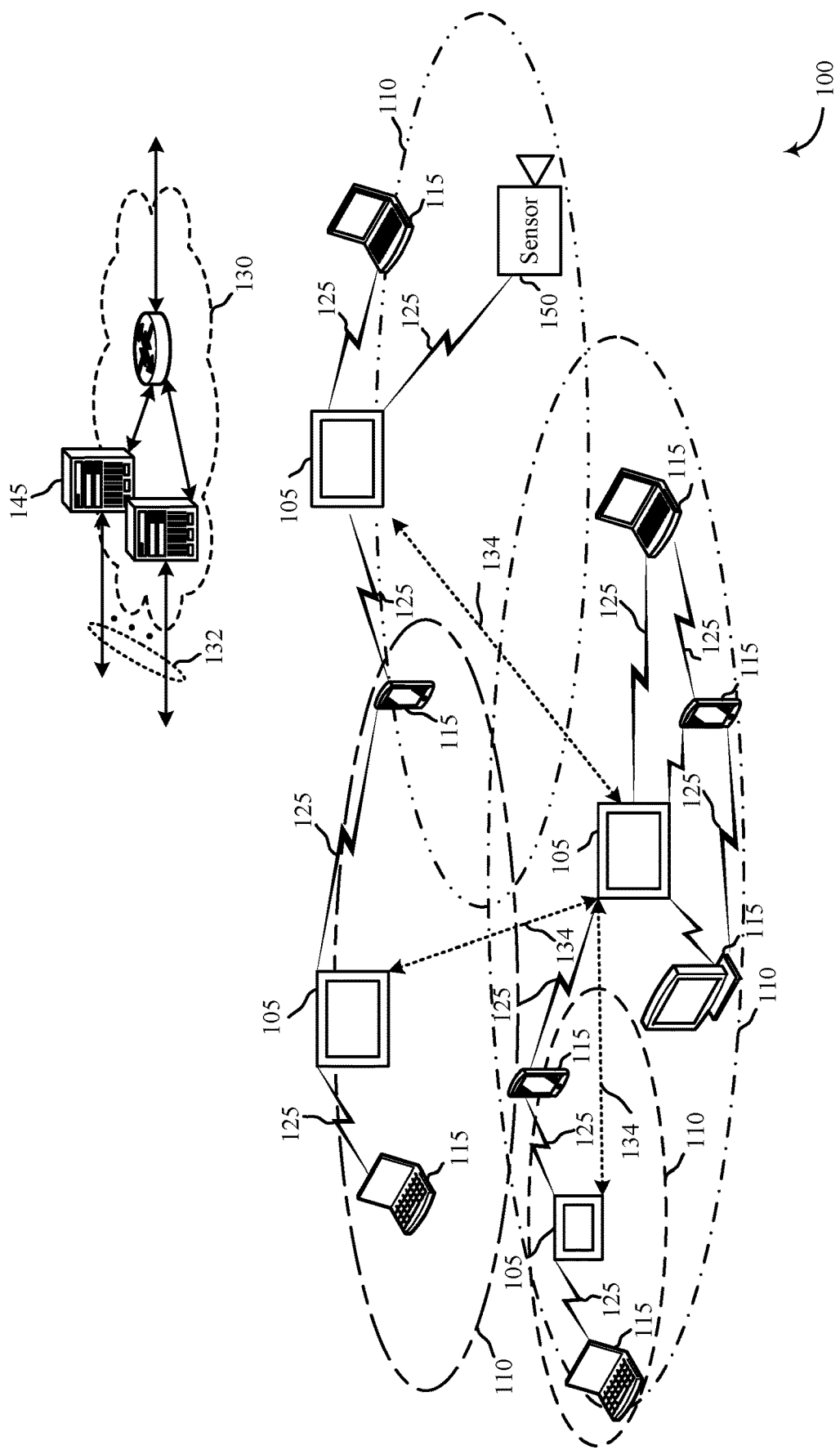
FIG. 1 shows a block diagram relating to a security and/or an automation system, in accordance with various aspects of this disclosure.

The present disclosure provides description of systems and methods for adaptive video playback. A video may be captured by a security camera of a security and automation system located at a premises. The systems and methods may identify portions of the video that are of relatively high interest to an occupant of the premises and identify portions of the video that are of relatively low to no interest to an occupant of the premises. For the identified portions of video that are of relatively low interest the systems and methods may be configured to autonomously select a first playback speed for the captured video, and for the identified portions of video that are of relatively high interest, the systems and methods may be configured to autonomously select a second playback speed.

The security system of a given premises may include one or more security cameras. The security cameras may be configured to capture video. In some cases, the video may be captured relative to a triggering event (e.g., motion, loud noise, etc.). An occupant of the premises may receive notification regarding a captured video and may be enabled to review the captured video either at the premises or remotely. Additionally, or alternatively, the captured video may be sent from the premises to an offsite location. For example, captured video may be sent to a monitoring service for review. The length of the captured videos may vary from video to video. Thus, the occupant and/or monitoring service may review captured videos that vary from in runtime length from seconds to minutes, and from minutes to hours. While reviewing a video that is 30 seconds in length or shorter may be relatively easy to review and identify whether closer review is called for, reviewing videos minutes to hours in length may become tedious and overly time-consuming, such as when the video contains portions of little to no interest.

The present systems and methods include analyzing video captured by one or more security cameras of a premises. The video may be analyzed to identify one or more aspects of the captured video. For example, the one or more aspects may include aspects such as runtime length, file size, and frame rate. Additionally, or alternatively, the one or more aspects of the video may include aspects such as an identified portion of the video that includes detected motion, an identified portion of the video that includes no detected motion, detecting whether an occupant of the premises appears in the video file, whether the occupant is moving or stationary, whether the occupant is known or unknown, whether a sensor is triggered in relation to at least a portion of the video file, and the like.

In some embodiments, a playback speed may be assigned to a captured video based on the one or more aspects associated with the captured video. In some cases, a video file may be assigned one of two or more predetermined playback speeds. As one example, a video with a runtime length of 30 seconds or less may be assigned a first playback speed such as at a one-to-one playback speed, where if the video is captured at 30 frames per second, the video is played at 30 frames per second. Thus, a 20 second video may take 20 seconds to play from start to finish at the one-to-one playback speed. On the other hand, continuing in the same example, a video with a runtime length over 30 seconds but below 1 minute may be assigned a second playback speed such as a one-to-two playback speed, where if the video is captured at 30 frames per second, every other frame is shown during playback. Thus, a 40 second video may take 20 seconds to play from start to finish at the one-to-two playback speed. Also, continuing in the same example, a video with a runtime length of 1 minute or over may be assigned a third playback speed such as a one-to-three playback speed, where if the video is captured at 30 frames per second, one frame is played for every three frames of video. Thus, a 60 second video may take 20 seconds to play from start to finish at the one-to-three playback speed. In some embodiments, one or more playback speeds may be assigned based on runtime length.

In some embodiments, a current playback speed may be modified for at least a portion of the video file that shows an occupant of the premises moving within the premises, for a portion of the video file that shows an occupant of the premises remaining stationary for a predetermined period of time, and/or for at least a portion of the video file that shows an unknown occupant. In some embodiments, occupants of the premises may be identified as known or unknown based at least in part on an identification determined by at least one of facial recognition, voice recognition, a detected cellphone identifier that is associated with a predetermined occupant, and so forth. In some cases, portions of the video file may be skipped. In some embodiments, a playback speed may be adjusted based on one or more triggered events. For example, a motion sensor may detect motion. A portion of the playback associated with this detected motion may be played at a predetermined playback speed based on the detected motion. In some cases, a sensor may detect a person falling. The playback speed of the video may be set to a predetermined playback based on the detected fall, and so forth.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a communications system 100 in accordance with various aspects of the disclosure. The communications system 100 may include control panels 105, devices 115, a network 130, and/or sensors 150. The network 130 may provide user authentication, encryption, access authorization, tracking, Internet Protocol (IP) connectivity, and other access, calculation, modification, and/or functions. The control panels 105 may interface with the network 130 through a first set of wired and/or wireless communication links 132 to communicate with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over a second set of wired and/or wireless communication links 134. Control panels 105 may communicate with a back end server (such as the remote servers 145)—directly and/or indirectly—using the first set of one or more communication links 132.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. In some embodiments, sensors 150 may include one or more security cameras. The one or more security cameras may capture video relative to a premises. The security cameras may be configured to transmit captured video to one or more predetermined destinations. The captured video may be analyzed to determine one or more aspects of the video in order to adaptively playback the video based on the determined aspects. A device 115 and/or a sensor 150 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
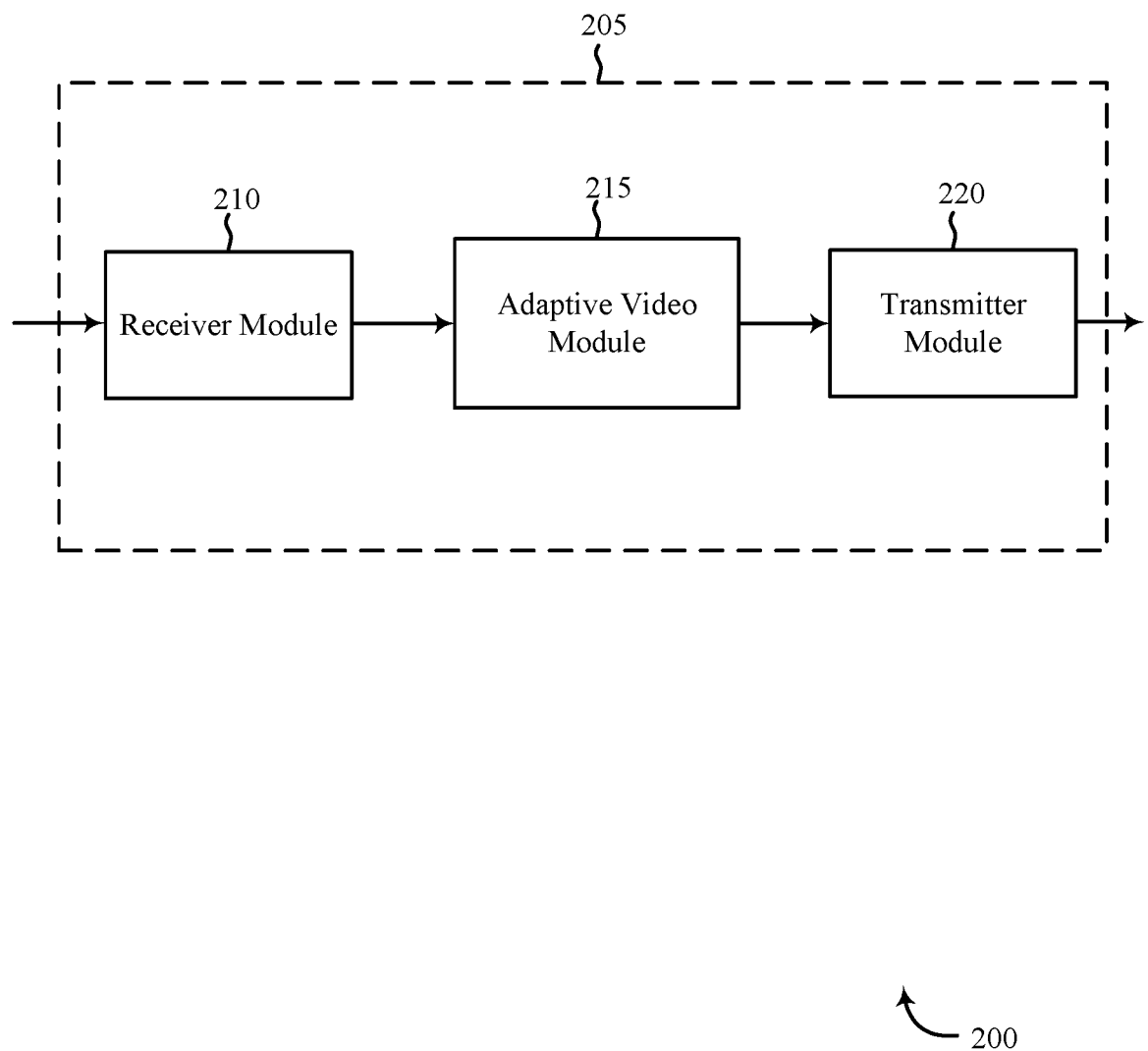
FIG. 2 shows a block diagram of a device relating to a security and/or an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 105 described with reference to FIG. 1. The control panel 205 may include a receiver module 210, an adaptive video module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive a video file captured by a security camera of a security and automation system. In some cases, the receiver module 210 may receive information regarding one or more aspects of the video file, information associated with the video such as data related to events detected by the security and automation system, timing information related to detected events, timing information for the video file, and so forth. Information may be passed on to the adaptive video module 215, and to other components of the control panel 205.

In one embodiment, adaptive video module 215 may receive the video file from the receiver module 210. Adaptive video module 215 may analyze the received video. Adaptive video module 215 may determine one or more aspects of the video based on this analysis. In some cases, adaptive video module 215 may analyze information sent with the video file such as information regarding detected events related to the video file, associated timing information, etc. In some cases, adaptive video module 215 may correlate a detected event with a portion of the video file based on the analysis. The correlation information may correlate the timing of a detected event with the timing information for a portion of the video file. For example, adaptive video module 215 may receive a time stamp associated with the detected event and define a start time and end time for a portion of the video file and associate this portion of the video with a detected event. In some cases, adaptive video module 215 may analyze the video file and detect one or more events from the analyzed video. For example, adaptive video module 215 may detect motion of an object or person from analysis of the video. Based on the analysis of the video, adaptive video module 215 may select one or more playback speeds for the video file.

The transmitter module 220 may transmit the one or more signals received from other components of the control panel 205. The transmitter module 220 may receive a video file from adaptive video module 215 and/or information regarding analysis of the video file. In some cases, transmitter module 220 may receive from adaptive video module 215 one or more playback speeds for the video file. In some embodiments, transmitter module 220 may transmit the video file and/or information associated with the video file to one or more predetermined destinations such as an occupant of a premises, a security monitoring service, etc. In some examples, the transmitter module 220 may be collocated with the receiver module 210 in a transceiver module.

Figure 3:
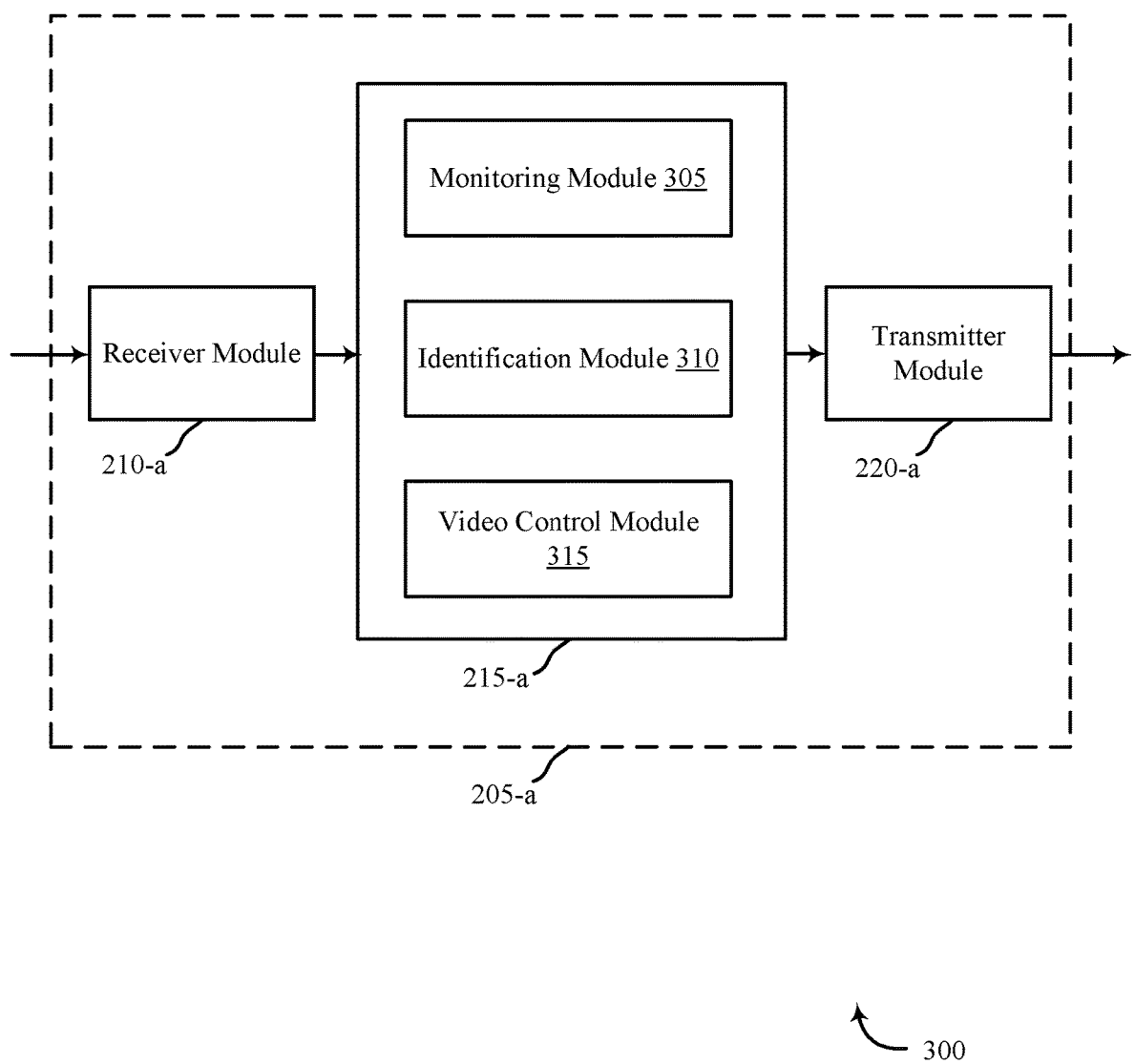
FIG. 3 shows a block diagram of a device relating to a security and/or an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, an adaptive video module 215-a, and/or a transmitter module 220-a, which may be examples of the corresponding modules of control panel 205. The control panel 205-a may also include a processor. Each of these components may be in communication with each other. The adaptive video module 215-a may include monitoring module 305, identification module 310, and video control module 315. The receiver module 210-a and the transmitter module 220-a may perform the functions of the receiver module 210 and the transmitter module 220, of FIG. 2, respectively.

The components of the control panel 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, monitoring module 305 may monitor a security system of a premises. The premises may include any one of a home, an office, a school, a factory, a parking lot, etc. In some cases, monitoring module 305 may be configured to monitor a predetermined area of the premises such as a room, a hallway, an entrance, a parking lot, etc.

In one embodiment, identification module 310 may identify a video file captured by a security system of the premises. For example, the security system may include one or more security cameras. Thus, one or more video files may be generated by the one or more security cameras and the identification module 310 may identify the one or more video files. In some cases, the one or more video files may be merged into a single video file.

In some embodiments, identification module 310 may determine one or more aspects of the video file. For example, identification module 310 may analyze a video file to determine one or more aspects of the video file. In some cases, the one or more detected aspects of the video file include at least one of runtime, file size, frame rate, and the like. Additionally, or alternatively, the one or more aspects of the video file determined by the identification module 310 may include at least one of detecting whether an occupant of the premises appears in the video file, detecting whether the occupant is moving or stationary in the video file, detecting whether an occupant in the video file is known or unknown, detecting whether a sensor is triggered in relation to at least a portion of the video file, and so forth.

In one embodiment, video control module 315 may select a first playback speed based at least in part on one or more aspects of the video file identified by the identification module 310 and play the video file at the first playback speed. For example, the analyzed video file may be delivered to a remote video playing system. A user at the remote video playing system may select the analyzed video file and instruct the system to play the video. Accordingly, video control module 315 may play the video at the selected playback speed. Additionally, or alternatively, the analyzed video may be delivered to a remote video playing system and automatically start playing the video at the selected playback speed. As one example, the analyzed video may be sent to an occupant of the premises (e.g., emailed to an email of the occupant, saved in a predetermined storage location, etc.). Additionally, or alternatively, the analyzed video may be sent to a security monitoring service for review. In some cases, the adaptive video module 215-*a* may generate a notification regarding an identified video. Accordingly, video may be captured by a security system at a home, for example, analyzed and sent to the occupant and/or security monitoring service (e.g., with a notification, etc.), and then the analyzed video may be played to the occupant and/or the security monitoring service at one or more playback speeds selected by the video control module 315.

In some embodiments, video control module 315 may assign the first playback speed to the video file when the video file is within a first runtime range. Additionally, or alternatively, video control module 315 may assign a second playback speed to the video file when the video file is within a second runtime range. In some cases, the second playback speed may be different than the first playback speed. For example, playback speeds may be selected according to the runtime of video files. For instance, a video file with a runtime of 30 seconds or less may be played at a 1-to-1 playback ratio where each frame is played in real time (e.g., a video file captured at 30 frames per second (fps) is played at 30 fps), a video file with a runtime over 30 seconds may be played at a 1-to-2 playback ratio (e.g., a video file captured at 30 fps played back at 15 fps), a video file over 1 minute may be played at a 1-to-5 playback ratio (e.g., a video file captured at 30 fps played back at 6 fps), a video file over 5 minutes may be played at a 1-to-10 playback ratio (e.g. a video captured at 30 fps played back at 3 fps), a video file over 10 minutes may be played at a 1-to-30 playback ratio (e.g. a video captured at 30 fps played back at 1 fps), and so forth.

In some embodiments, video control module 315 may reduce a current playback speed for at least a portion of the video file that shows an occupant of the premises moving within the premises. For example, a portion of a 5-minute video may show an occupant moving within the view of the security camera that captured the video. Thus, in one embodiment, a first playback speed may be assigned in general to the 5-minute video based on the runtime of 5 minutes and a second playback speed may be assigned to a portion of this 5-minute video that shows the occupant moving within the premises. Thus, if the occupant is shown moving for the first 10 seconds of the second minute of the 5-minute video, then the first minute of the video may be played at the first playback speed, the first 10 seconds of the second minute at the second playback speed, and then the video control module 315 may switch back to the first playback speed for the remaining portion of the video.

In some configurations, video control module 315 may adjust a current playback speed for at least a portion of the video file that shows an occupant of the premises remaining stationary for a predetermined period of time. For instance, a stationary threshold of 10 seconds, as one example, may be configured. When an occupant is detected as remaining stationary for at least 10 seconds, satisfying the stationary threshold, then video control module 315 may adjust the playback speed such as increasing the playback speed. In some embodiments, video control module 315 may return to a previous playback speed based on detecting an occupant of the premises becoming stationary after the occupant was detected moving. Thus, in some cases, video control module 315 may detect an occupant moving and reduce the playback speed for a portion of the video file that shows the occupant moving and then increase the playback speed once the video no longer shows the occupant moving (e.g., video shows occupant moving and then exiting the camera's view, video shows occupant moving and then sitting down on a couch, etc.). As one example, the video control module 315 may adjust the playback speed for a portion of video that shows the occupant getting up from sitting in a chair and moving and then adjust the playback speed again once the occupant returns to sitting in the chair. For instance, the video control module 315 may slow the playback speed down for the portion of the video showing the occupant getting up and moving and then speed up the playback speed once the occupant is shown to be stationary after moving. Thus, an occupant may enter the camera's view for which playback may be slowed down, then the occupant may remain stationary (e.g., sit down, stand still within the camera's view, etc.) for which the playback may be sped up, then walk out of the camera's view for which the playback may be slowed down again, and then once the occupant is out of the camera's view the playback may again be increased. In some embodiments, identification module 310 may identify timing information of the video in relation to detected movement and non-movement, etc. Thus, for a 2-minute video identification module 310 may identify a start time and end time associated with the detected movement (e.g., movement starts at 1 minute 34 seconds and ends at 1 minute 52 seconds in the 2-minute video).

In some embodiments, video control module 315 may skip at least a portion of the video file that includes no detected motion. For example, video control module 315 may play only portions of video that include detected motion captured in the video file. Thus, portions of a 5-minute video that shows an occupant moving within the premises may be shown in playback and portions of the 5-minute video without motion may be skipped during playback.

In some embodiments, video control module 315 may reduce a current playback speed for at least a portion of the video file that shows an unknown occupant. Adaptive video module 215-*a* may include one or more features of a security system, including software, hardware, and firmware of security system components such as control panels, sensors, etc. Thus, in some embodiments, adaptive video module 215-*a* may monitor for the identity of occupants in a premises. The identity of the occupants may be based on video of the occupants, photos of the occupants, facial recognition, voice recognition, signals associated with the occupants, etc. Thus, as one example, the identity of occupants may be detected by the adaptive video module 215-*a*, in conjunction with the identification module 310, based at least in part on mobile device signals associated with occupants of the premises such as a unique identifier associated with a mobile device. In the same example, the adaptive video module 215-*a*, in conjunction with the identification module 310, may detect a signal of an unknown mobile device. In one embodiment, the video control module 315 may associate a time stamp relative to the detection of the unknown mobile device with a portion of the video file. Thus, in some embodiments, video control module 315 may reduce the playback speed in relation to a portion of the video file associated with the detection of the unknown mobile device.

In some embodiments, video control module 315 may increase a current playback speed in relation to a first sensor of the security system being triggered. Additionally, or alternatively, video control module 315 may decrease the current playback speed in relation to a second sensor of the security system being triggered. For example, the identification module 310 may identify at least one of a motion sensor, smoke alarm sensor, glass break sensor, door sensor, window sensor, infrared sensor, beam sensor, vibration sensor, gas sensor, etc., of the security system being triggered in relation to the video file being captured. A time associated with the triggered sensor may be noted by the identification module 310 and associated with a time stamp of the video file. Accordingly, video control module 315 may decrease the playback speed in relation to a portion of the video file associated with the time stamp. Likewise, identification module 310 may identify a sensor such as a temperature sensor being triggered and the video control module 315 may increase or maintain the playback speed upon identifying this sensor.

Figure 4:
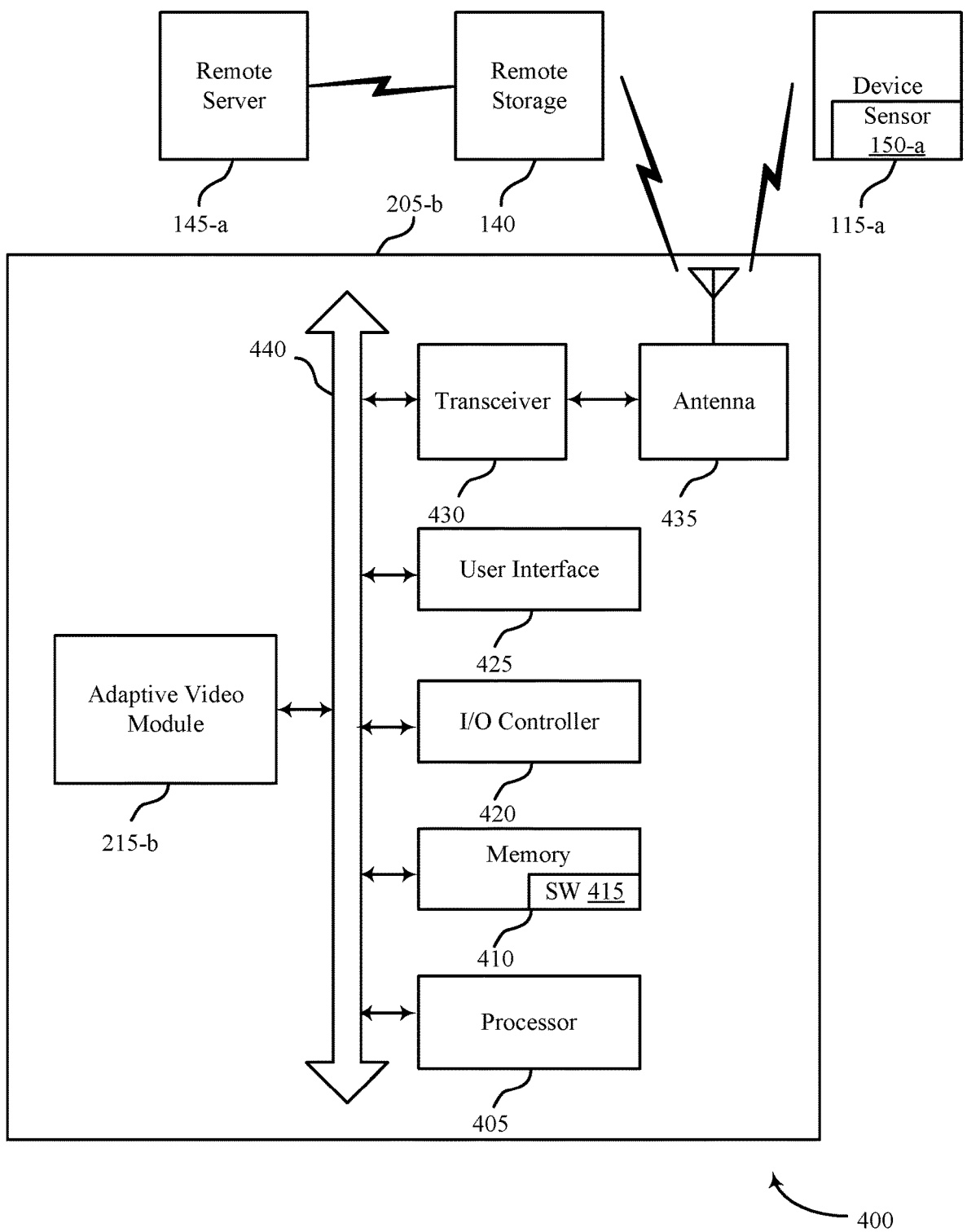
FIG. 4 shows a block diagram of an apparatus relating to a security and/or an automation system, in accordance with various aspects of this disclosure.

FIG. 4 shows a system 400 for use in adaptive video playback systems, in accordance with various examples. System 400 may include a control panel 205-*b*, which may be an example of the control panels 105 of FIG. 1. Control panel 205-*b* may also be an example of one or more aspects of control panels 205 and/or 205-*a* of FIGS. 2 and 3. In some embodiments, the terms a control panel and a control device are used synonymously.

Control panel 205-*b* may also include components for bi-directional voice and data communications including components for transmitting communications and components for receiving communications. For example, control panel 205-*b* may communicate bi-directionally with one or more of device 115-*a*, one or more sensors 150-*a*, remote storage 140, and/or remote server 145-*a*, which may be an example of the remote server of FIG. 1. This bi-directional communication may be direct (e.g., control panel 205-*b* communicating directly with remote storage 140) or indirect (e.g., control panel 205-*b* communicating indirectly with remote server 145-*a* through remote storage 140).

In some embodiments, the control panel 205-*b* may include an adaptive video module 215-*b*, which may be an example of the corresponding modules of control panel 105 of FIG. 1 and control panels 205 of FIGS. 2 and/or 3. The adaptive video module 215-*b* may capture a video in conjunction with a security camera of a security and automation system located at a premises. The adaptive video module 215-*b* may identify the video and determine one or more aspects of the video such as runtime, frame rate, etc. Based on the one or more determined aspects of the video, the adaptive video module 215-*b* may be configured to autonomously select one or more playback speeds for the captured video.

Control panel 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 140, and/or remote server 145-*a*. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of control panel 205-*b* (e.g., one or more antennas 435, transceiver module 430, etc.) may provide a direct connection to a remote server 145-*a* via a direct network link to the Internet via a POP (point of presence). In some embodiments, one element of control panel 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of control panel 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., capture a video, determine one or more aspects of the video, and based on the one or more determined aspects of the video, autonomously select one or more playback speeds for the captured video, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions.

The control panel 205-b may include an adaptive video module 215-b, which may perform the functions described above for the adaptive video modules 215 of FIGS. 1, 2 and/or 3.

Figure 5:
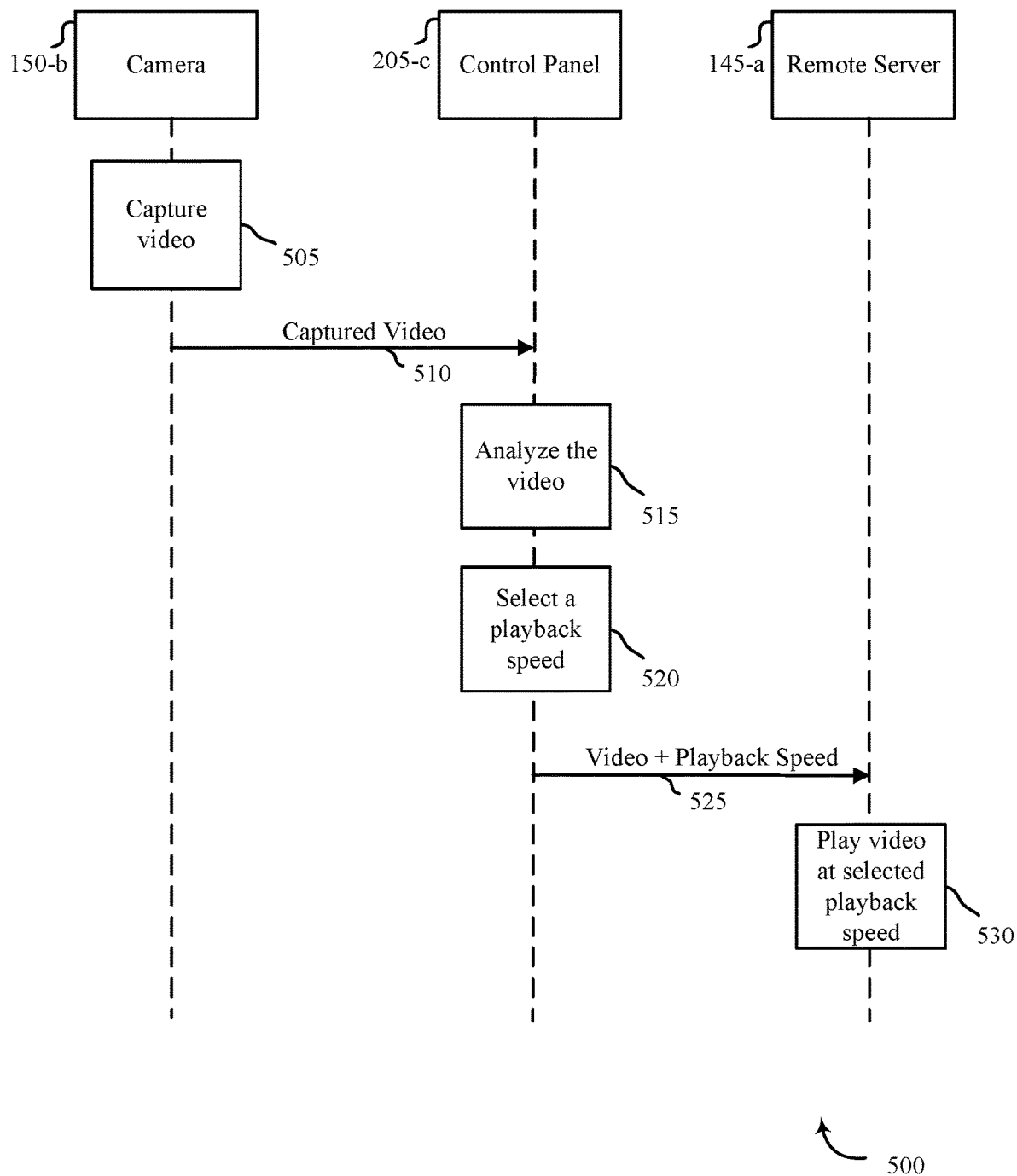
FIG. 5 shows a flow diagram of a system relating to a security and/or an automation system, in accordance with various aspects of this disclosure.

FIG. 5 shows a flow diagram of a system 500 relating to a security and/or an automation system, in accordance with various aspects of this disclosure. The system 500 may include a camera 150-b, which may be an example of sensor 150 of FIGS. 1 and/or 4, a control panel 205-c, which may be an example of the control panels 105/205 of FIGS. 1, 2, 3, and/or 4, and a remote server 145-a, which may be an example of remote server 145 of FIG. 1. In some embodiments, one or more aspects of system 500 may be performed in conjunction with adaptive video module 215 of FIGS. 2, 3, and/or 4.

As depicted, at block 505, camera 150-b may capture a video. For example, camera 150-b may be located at a premises such as a home, school, or business and may capture one or more videos. At 510, camera 150-b may send one or more captured videos to control panel 205-c. At block 515, control panel 205-c may analyze a video received from the camera 150-b. By the analysis, control panel 205-c may identify one or more aspects of the analyzed video. For example, control panel 205-c may determine a runtime of the video is 1 minute 30 seconds, that motion was detected in relation to the captured video, etc. Based on the detected aspects of the video, at block 520 the control panel 205-c may select at least one playback speed for the video. For example, control panel 205-c may select a first playback speed for a portion of the video without motion and a second playback speed for a portion of the video that contains motion, etc. At 525, control panel 205-c may send the video, one or more selected playback speeds for the video, and/or one or more detected aspects of the video to remote server 145-a. In one embodiment, remote server 145-a may include a computing device located at the premises where the camera 150-b is located. Alternatively, remote server 145-a may include a computing device at a location remote to the premises such as a computer used by a remote security monitoring service. At block 530, the video may be played at the one or more selected playback speeds.

Figure 6:
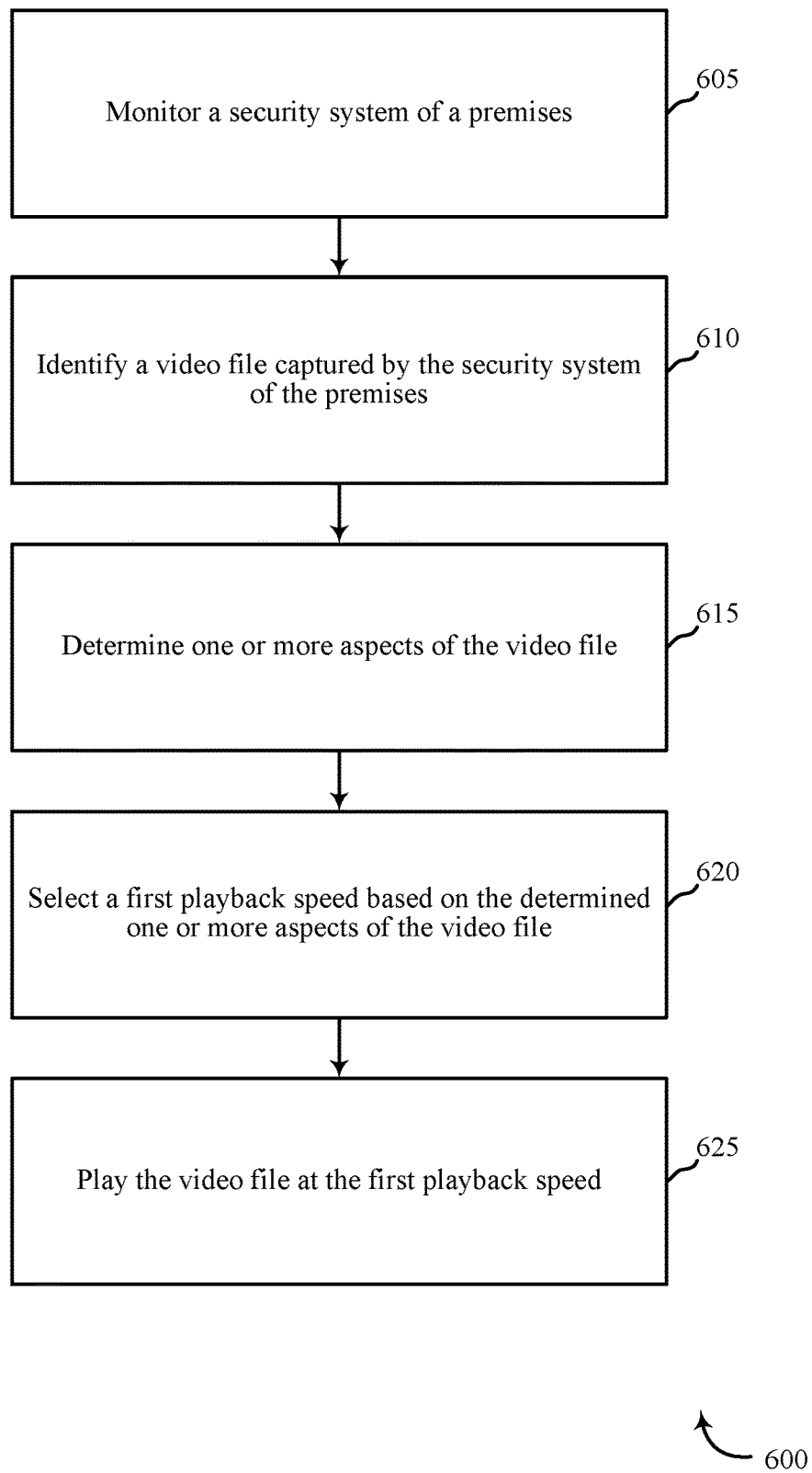
FIG. 6 is a flow chart illustrating an example of a method relating to a security and/or an automation system, in accordance with various aspects of this disclosure.

FIG. 6 is a flow chart illustrating an example of a method 600 for adaptive video playback, in accordance with various aspects of the present disclosure. For clarity, the method 600 is described below with reference to aspects of one or more of the control panels 105, devices 115, sensors 150, and/or the one or more remote servers 145 of FIG. 1, and/or aspects of one or more of the adaptive video module 215 described with reference to FIGS. 2, 3, and/or 4. In some examples, a control panel, client device, backend server, and/or sensor may execute one or more sets of codes to perform the functions described below. Additionally or alternatively, the control panel, client device, backend server, and/or sensor may perform one or more of the functions described below using special-purpose hardware.

At block 605, the method 600 may include monitoring a security system of a premises. At block 610, the method 600 may include identifying a video file captured by the security system of the premises. At block 615, the method 600 may include determining one or more aspects of the video file. For example, the one or more aspects of the video file may include at least one of runtime, file size, frame rate, etc. At block 620, the method 600 may include selecting a first playback speed based on the determined one or more aspects of the video file. At block 625, the method 600 may include playing the video file at the first playback speed.

Thus, the method 600 may provide for adaptive video playback in relation to security and automation systems. It should be noted that the method 600 is just one implementation and that the operations of the method 600 may be rearranged or otherwise modified such that other implementations are possible.

Figure 7:
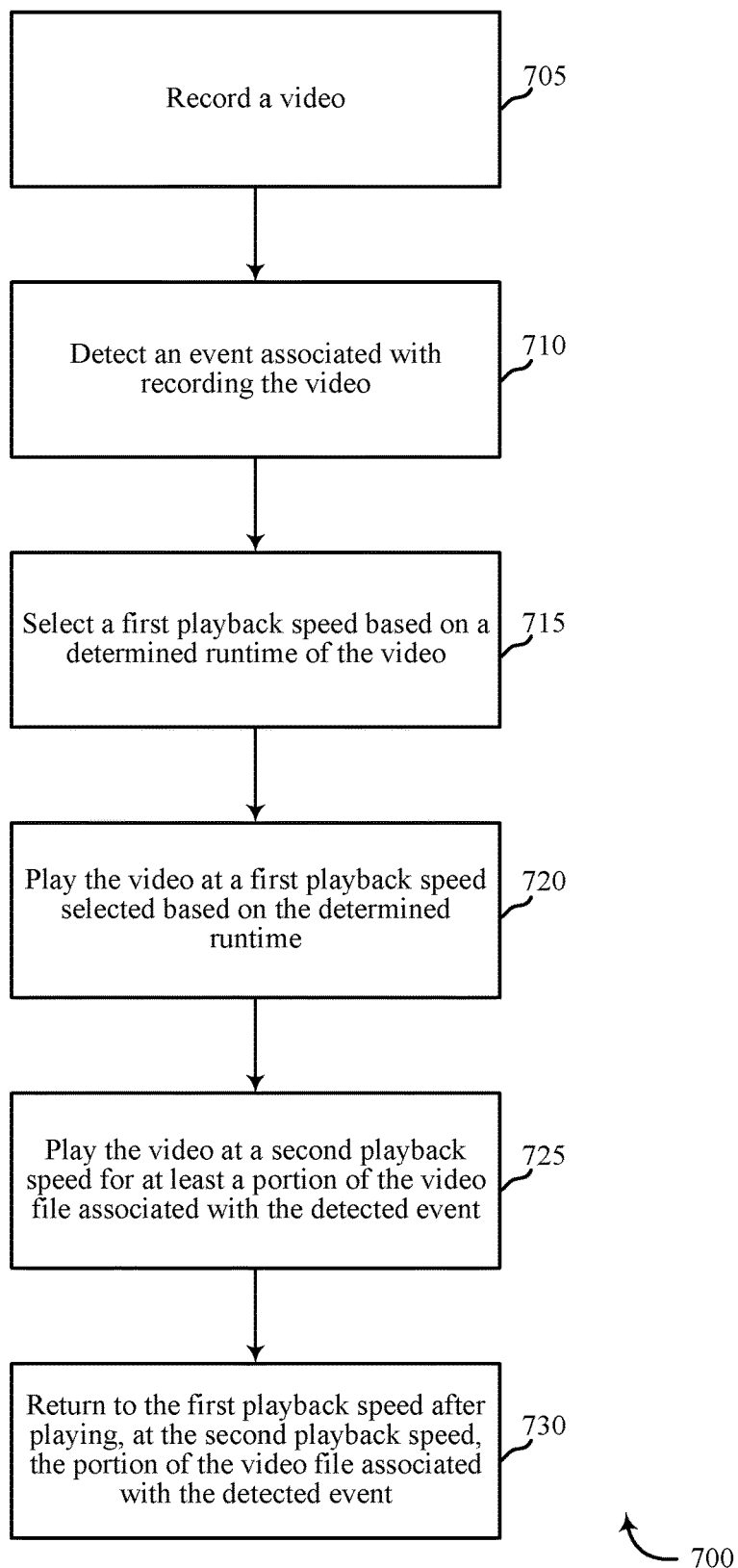
FIG. 7 is a flow chart illustrating an example of a method relating to a security and/or an automation system, in accordance with various aspects of this disclosure.

FIG. 7 is a flow chart illustrating an example of a method 700 for adaptive video playback, in accordance with various aspects of the present disclosure. For clarity, the method 700 is described below with reference to aspects of one or more of the control panels 105, devices 115, sensors 150, and/or the one or more remote servers 145 of FIG. 1, and/or aspects of one or more of the adaptive video module 215 described with reference to FIGS. 2, 3, and/or 4. In some examples, a control panel, client device, backend server, and/or sensor may execute one or more sets of codes to perform the functions described below. Additionally or alternatively, the control panel, client device, backend server, and/or sensor may perform one or more of the functions described below using special-purpose hardware.

At block 705, the method 700 may include recording a video. At block 710, the method 700 may include detecting an event associated with recording the video. At block 715, the method 700 may include selecting a first playback speed based on a determined runtime of the video. At block 720, the method 700 may include playing the video at a first playback speed selected based on the determined runtime. At block 725, the method 700 may include playing the video at a second playback speed for at least a portion of the video file associated with the detected event. In some embodiments, the detected event may include motion detection, broken glass detection, a tripped beam detection, and so forth. In some cases, the event may include a portion of the video that shows an occupant of the premises moving within the premises. At block 730, the method 700 may include returning to playing the video at the first playback speed after playing, at the second playback speed, the portion of the video file associated with the detected event.

Thus, the method 700 may provide for adaptive video playback in relation to security and automation systems. It should be noted that the method 700 is just one implementation and that the operations of the method 700 may be rearranged or otherwise modified such that other implementations are possible.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for improving security video automation, comprising:
   monitoring a security system of a premises;
   identifying a video file captured by the security system of the premises, the security system comprising a control panel at the premises and a sensor at the premises, wherein the sensor is a smoke alarm sensor, a glass break sensor, a door sensor, a window sensor, an infrared sensor, a beam sensor, a vibration sensor, or a gas sensor;
   determining one or more aspects of the video file;
   determining a first playback speed in accordance with the one or more aspects of the video file;
   detecting that an occupant of the premises shown in the video file is unknown based at least in part on determining that a detected cell phone signal is different than a predetermined cell phone signal associated with a known occupant of the premises;
   determining a second portion of the video file different than a first portion of the video file, wherein the sensor is triggered during the second portion of the video file and the second portion of the video file shows the unknown occupant of the premises based at least in part on a time stamp of the video file relative to the detected cell phone signal in the second portion of the video file, wherein the time stamp correlates the unknown occupant of the premises and the detection of the cell phone signal in the second portion of the video file;
   determining a second playback speed for the second portion of the video file based at least in part on determining that the occupant of the premises captured in the second portion of the video file is unknown;
   determining a third portion of the video file different than the first portion of the video file and the second portion of the video file based at least in part on an absence of the unknown occupant within the third portion of the video file; and
   playing the video file at the determined playback speeds, wherein playing the video file comprises:
     automatically playing the first portion of the video file at the first playback speed;
     automatically adjusting the first playback speed of the video file to the second playback speed based at least in part on determining the second portion of the video file;
     automatically playing the second portion of the video file at the second playback speed while the video file shows the unknown occupant and the sensor is triggered;
     detecting that the unknown occupant is stationary based on the unknown occupant remaining stationary for an amount of time that satisfies a threshold;
     adjusting the second playback speed to the first playback speed based at least in part on determining that the unknown occupant is stationary; and
     automatically omitting the third portion of the video file based at least in part on determining the third portion of the video file.

2. The method of claim 1, comprising:
   assigning the first playback speed to the video file when the video file is within a first runtime range; and
   assigning a third playback speed to the video file when the video file is within a second runtime range, the third playback speed being different than the first playback speed, wherein the first runtime range and the second runtime range indicate a range in unadjusted length of the video file, and the second runtime range is greater than the first runtime range.

3. The method of claim 1, wherein the one or more aspects of the video file comprises a runtime, the runtime comprising an unadjusted length of the video file.

4. The method of claim 1, the one or more aspects of the video file comprising a video file size, a captured frame rate, detecting whether the unknown occupant of the premises or the known occupant of the premises appears in the video file, detecting whether the known occupant of the premises is moving or stationary, and detecting whether the sensor is triggered in relation to at least the second portion of the video file.

5. The method of claim 4, comprising:
reducing a current playback speed for at least the second portion of the video file that shows the known occupant of the premises moving within the premises.

6. The method of claim 4, comprising:
omitting at least the second portion of the video file that includes no detected motion.

7. The method of claim 4, comprising:
returning to a previous playback speed based on detecting the known occupant of the premises becoming stationary after the known occupant of the premises was detected moving.

8. The method of claim 1, comprising:
increasing a current playback speed in relation to a first sensor of the security system being triggered; and
decreasing the current playback speed in relation to a second sensor of the security system being triggered.

9. An apparatus for an automation system, comprising:
a processor;
memory in electronic communication with the processor; and
instructions stored in the memory, the instructions being executable by the processor to perform the steps of:
monitoring a security system of a premises;
identifying a video file captured by the security system of the premises, the security system comprising a control panel at the premises and a sensor at the premises, wherein the sensor is a smoke alarm sensor, a glass break sensor, a door sensor, a window sensor, an infrared sensor, a beam sensor, a vibration sensor, or a gas sensor;
determining one or more aspects of the video file;
determining a first playback speed in accordance with the one or more aspects of the video file;
detecting that an occupant of the premises shown in the video file is unknown based at least in part on determining that a detected cell phone signal is different than a predetermined cell phone signal associated with a known occupant of the premises;
determining a second portion of the video file different than a first portion of the video file, wherein the sensor is triggered during the second portion of the video file and the second portion of the video file shows the unknown occupant of the premises based at least in part on a time stamp of the video file relative to the detected cell phone signal in the second portion of the video file, wherein the time stamp correlates the unknown occupant of the premises and the detection of the cell phone signal in the second portion of the video file;
determining a second playback speed for the second portion of the video file based at least in part on determining that the occupant of the premises captured in the second portion of the video file is unknown;
determining a third portion of the video file different than the first portion of the video file and the second portion of the video file based at least in part on an absence of the unknown occupant within the third portion of the video file; and
playing the video file at the determined playback speeds, wherein playing the video file comprises:
automatically playing the first portion of the video file at the first playback speed;
automatically adjusting the first playback speed of the video file to the second playback speed based at least in part on determining the second portion of the video file;
automatically playing the second portion of the video file at the second playback speed while the video file shows the unknown occupant and the sensor is triggered;
detecting that the unknown occupant is stationary based on the unknown occupant remaining stationary for an amount of time that satisfies a threshold;
adjusting the second playback speed to the first playback speed based at least in part on determining that the unknown occupant is stationary; and
automatically omitting the third portion of the video file based at least in part on determining the third portion of the video file.

10. The apparatus of claim 9, the instructions being executable by the processor to perform the steps of:
assigning the first playback speed to the video file when the video file is within a first runtime range; and
assigning a third playback speed to the video file when the video file is within a second runtime range and the unknown occupant, the third playback speed being different than the first playback speed, wherein the first runtime range and the second runtime range indicate a range in unadjusted length of the video file, and the second runtime range is greater than the first runtime range.

11. The apparatus of claim 9, wherein the one or more aspects of the video file comprises a runtime, the runtime comprising an unadjusted length of the video file.

12. The apparatus of claim 9, the one or more aspects of the video file comprising a video file size, a captured frame rate, detecting whether the unknown occupant of the premises or the known occupant of the premises appears in the video file, detecting whether the known occupant of the premises is moving or stationary, and detecting whether the sensor is triggered in relation to at least the second portion of the video file.

13. The apparatus of claim 12, the instructions being executable by the processor to perform the step of:
reducing a current playback speed for at least the second portion of the video file that shows the known occupant of the premises moving within the premises.

14. The apparatus of claim 12, the instructions being executable by the processor to perform the step of:
omitting at least the second portion of the video file that includes no detected motion.

15. The apparatus of claim 12, the instructions being executable by the processor to perform the step of:
returning to a previous playback speed based on detecting the known occupant of the premises becoming stationary after the known occupant of the premises was detected moving.

16. A non-transitory computer-readable medium storing computer-executable code for an automation system, the code executable by a processor to perform the steps of:
monitoring a security system of a premises;
identifying a video file captured by the security system of the premises, the security system comprising a control panel at the premises and a sensor at the premises, wherein the sensor is a smoke alarm sensor, a glass break sensor, a door sensor, a window sensor, an infrared sensor, a beam sensor, a vibration sensor, or a gas sensor;
determining one or more aspects of the video file;

determining a first playback speed in accordance with the one or more aspects of the video file;

detecting that an occupant of the premises shown in the video file is unknown based at least in part on determining that a detected cell phone signal is different than a predetermined cell phone signal associated with a known occupant of the premises;

determining a second portion of the video file different than a first portion of the video file, wherein the sensor is triggered during the second portion of the video file and the second portion of the video file shows the unknown occupant of the premises based at least in part on a time stamp of the video file relative to the detected cell phone signal in the second portion of the video file, wherein the time stamp correlates the unknown occupant of the premises and the detection of the cell phone signal in the second portion of the video file;

determining a second playback speed for the second portion of the video file based at least in part on determining that the occupant of the premises captured in the second portion of the video file is unknown;

determining a third portion of the video file different than the first portion of the video file and the second portion of the video file based at least in part on an absence of the unknown occupant within the third portion of the video file; and playing the video file at the determined playback speeds, wherein playing the video file comprises:

automatically playing the first portion of the video file at the first playback speed;

automatically adjusting the first playback speed of the video file to the second playback speed based at least in part on determining the second portion of the video file;

automatically playing the second portion of the video file at the second playback speed while the video file shows the unknown occupant and the sensor is triggered;

detecting that the unknown occupant is stationary based on the unknown occupant remaining stationary for an amount of time that satisfies a threshold;

adjusting the second playback speed to the first playback speed based at least in part on determining that the unknown occupant is stationary; and automatically omitting the third portion of the video file based at least in part on determining the third portion of the video file.

17. The method of claim 1, wherein the second playback speed is slower than the first playback speed.

18. The non-transitory computer-readable medium of claim 16, wherein the code executable by the processor to further perform the steps of:

assigning the first playback speed to the video file when the video file is within a first runtime range; and assigning a third playback speed to the video file when the video file is within a second runtime range, the third playback speed being different than the first playback speed, wherein the first runtime range and the second runtime range indicate a range in unadjusted length of the video file, and the second runtime range is greater than the first runtime range.

19. The non-transitory computer-readable medium of claim 16, wherein the one or more aspects of the video file comprises a runtime, the runtime comprising an unadjusted length of the video file.

20. The non-transitory computer-readable medium of claim 16, wherein the one or more aspects of the video file comprise a video file size, a captured frame rate, detecting whether the unknown occupant of the premises or the known occupant of the premises appears in the video file, detecting whether the known occupant of the premises is moving or stationary, and detecting whether the sensor is triggered in relation to at least the second portion of the video file.

* * * * *